United States Patent
Pontius

(10) Patent No.: US 6,513,105 B1
(45) Date of Patent: Jan. 28, 2003

(54) FIFO SYSTEM WITH VARIABLE-WIDTH INTERFACE TO HOST PROCESSOR

(75) Inventor: Timothy A. Pontius, Lake in the Hills, IL (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/307,164

(22) Filed: May 7, 1999

(51) Int. Cl.[7] .............................................. G06F 12/00
(52) U.S. Cl. .......................... 711/209; 710/33; 710/65; 710/305; 710/310
(58) Field of Search .............................. 710/33, 34, 65, 710/66, 305, 306, 307, 310; 711/209

(56) References Cited

U.S. PATENT DOCUMENTS 5,673,396 A    9/1997  Smolansky et al. ......... 395/250
6,385,672 B1 *  5/2002  Wang et al. .................. 710/56

OTHER PUBLICATIONS

"HDL Synthesis: Synthesis Application Note" SynopSys, Inc., Aug. 1996, pp. 11–27.

* cited by examiner

Primary Examiner—Matthew Kim
Assistant Examiner—Christian P. Chace
(74) Attorney, Agent, or Firm—Peter Zawilski

(57) ABSTRACT

A computer system includes a RAM-based FIFO for buffering communications between a host processor and a remote serial-communications device. The FIFO provides for quadlet, doublet, and singlet transfer widths depending on the memory-mapped IO address asserted by the processor. Quadlet transfers can be implemented until the amount of data remaining to be transferred is less than four bytes. For each quadlet transfer, the read pointer, in the case of a read operation, or the write pointer, in the case of a write operation, is incremented by four. If two or three bytes of data remain after the quadlet transfers, a doublet transfer can be implemented; in this case, the appropriate pointer is incremented by two. Finally, if a byte of data remains after the quadlet transfers and a possible doublet transfer, then a singlet transfer is effected. In this case, the appropriate pointer is incremented by one. For example, 31 bytes of data in an 8×4-byte FIFO can be transferred in seven quadlet transfers, one doublet transfer, and one byte-wide transfer. The use of the wide transfers greatly reduces the processor overhead in servicing the FIFO, making more processor power available to concurrently running tasks and improving system performance overall.

6 Claims, 2 Drawing Sheets

FIFO SYSTEM WITH VARIABLE-WIDTH INTERFACE TO HOST PROCESSOR

BACKGROUND OF THE INVENTION

The present invention relates to computer systems and, more particularly, to an improvement in buffered communications with a host processor. A major objective of the invention is to reduce the processing overhead involved in servicing a RAM-based FIFO buffering data transfers between a host processor and a remote communications device.

Much of modern progress is associated with advances in computer technology. Computers have advanced from 8-bit processors performing a few million operations per second, to 16-bit processors performing tens of millions of operations per second, and to 32-bit and beyond processors performing hundreds of millions of operations per second. As computers have become more powerful, the tasks they perform have diversified. To perform these tasks, various types of peripherals, e.g., printers, modems, scanners, pointing devices, and keyboards are connected to computers.

In many cases, for example with modems, the rate at which data is transferred falls far below the rate at which a host processor can process data. To more fully utilize available computer power, communications with the host processor are typically buffered. Thus, when a host processor is to transmit ("write") data, it transfers the data quickly to a buffer. The remote device then reads the data from the buffer at its own, typically relatively slow, rate, while the host processor attends to other tasks. When the buffer is empty or nearly empty, the buffer notifies the host processor, which can then supply a next packet of data. Likewise, data transferred from a remote device to a host processor can be buffered. The buffer can be filled slowly. Once the buffer contains a useful amount of data, it can be transferred to ("read" by) the processor rapidly.

Typically, such buffers transmit first the data that is received first. In other words, they are first-in-first-out (FIFO) devices. A typical FIFO implementation includes a random access memory (RAM) array, in which data is stored at consecutive address locations. A read pointer is, typically, a register that indicates the memory location of the oldest received data that has not yet been read; in the case of a read operation, the read register is incremented each time the contents of the memory location is read. Likewise, a write pointer points to a memory location following that most recently written to; in the case of a write operation, the write pointer is incremented each time data is stored in a FIFO memory location.

Reads begin at the location indicated by the read pointer, while writes begin at the location indicated by the write pointer. The difference in the addresses associated with the read and write pointers indicates the amount of data stored in the FIFO. (The difference is calculated modulo the number of FIFO memory locations to accommodate wrapping of data from the highest to lowest addresses.)

In the case of a serial remote device, such as those using a Universal Asynchronous Receiver Transmitter (UART), data is transmitted between the FIFO and the remote device one-bit at a time. Typically, a shift register groups the bits into bytes (groups of eight bits). When the shift register is full, the data can be output in parallel to a byte-wide memory location. It should be noted that such FIFOs are not limited to serial remote devices; for example, byte-wide parallel communications with a remote device are provided for—eliminating the need for an input shift register.

Clearly, this grouping of bits can be applied for whatever data width is associated with the FIFO. U.S. Pat. No. 5,673,396 to Smolansky et al. discloses a FIFO in which this width is selectable so that a tradeoff can be made between the number of memory locations and the amount of data that can be stored per memory location.

The communications path between the FIFO and the host processor is typically parallel. For example, byte-wide data busses carry stored data one byte at a time between the processor and the FIFO. Typically, a read FIFO transmits interrupts to a processor to indicate when it is empty, has any data, has a meaningful amount of data, is almost full, and is full. The processor can then inquire of the FIFO the actual amount of data stored and initiate a transfer of the data. Once the transfer is complete, the host processor can return to whatever task it was attending to before the transfer while the remote device begins to refill the FIFO.

The transfer between the FIFO and the host processor takes place at a much higher rate than does the transfer between the FIFO and the remote device. For this reason, the transfers occupy only a small portion of the host processor's duty cycle. The remaining portion of the duty cycle can be utilized for other tasks. Of course, any available capacity is readily consumed by other tasks assumed by the computer. From the perspectives of these tasks, any servicing of the FIFO can appear as a performance limitation. What is needed is a system that minimizes the performance impairment due to the servicing of a communications FIFO.

SUMMARY OF THE INVENTION

The present invention provides for dynamically varying the widths of synchronous read and write transfers between a host processor and a FIFO during the course of a data transfer procedure. (Herein, a "transfer procedure" refers to a transfer of data that coexists in the FIFO either at the beginning or at the end of the procedure.) The FIFO can have a minimum transfer width, a maximum transfer width, and, optionally, one or more intermediate transfer widths. Preferably, all transfer widths are integer multiples of the minimum transfer width. The dynamic change allows remainders data to be transferred efficiently. This is not the case for the non-dynamic storage width variation disclosed in U.S. Pat. No. 5,673,396 (which varies storage width, but not during a data transfer procedure).

Preferably, maximum-width transfers are implemented until there is insufficient data for a maximum-width transfer. Any remainder is then transferred using lesser-width transfers. For example, if the FIFO permits only quadlet (four-byte) and singlet (one-byte) synchronous transfers, quadlet transfers can be implemented until there are fewer than four bytes of data left to be transferred; any remainder is transferred using singlet transfers. If the FIFO also permits doublet (two-byte) transfers, such a transfer can be used whenever the remainder equals two or three bytes. If triplet (three-byte) transfers are permitted in addition to quadlet, doublet, and singlet, only one remainder transfer is required for each transfer procedure. The various alternatives involve a tradeoff between the maximum number of transfers that might be required for a transfer procedure and complexity of the FIFO.

In the case of a write operation, the processor "knows" the amount of data to be transferred and thus can arrange the data optimally into maximum width, intermediate width and minimum width groups. In the case of a read operation, the processor can access a register in the FIFO that indicates the amount of data to be read so that the data can be grouped optimally. The processor determines the width of each transfer. For example, this can be done by assigning each transfer width to a different memory-mapped IO address associated with the FIFO. The FIFO is designed to set the transfer width according to the address asserted by the processor.

The FIFO increments a pointer in association with each transfer. A write pointer is incremented during a write operation, and a read pointer is incremented during a read operation. The amount of the increment is dependent on the transfer mode. A unit increment corresponds to a minimum-width transfer. The ratio of the actual transfer width to the minimum transfer width determines the multiple of the unit for incrementing the pointers in the various transfer modes. Thus, the appropriate pointer is incremented four units for each quadlet (four-byte) transfer for a FIFO with a singlet (one-byte) minimum transfer width.

The FIFO control logic responds to transfer requests by moving the appropriate pointer by a number of addresses equal to the multiple of the storage width represented by the transfer width. The read pointer is the appropriate pointer for reads of an input FIFO, the write pointer is the appropriate pointer for an output FIFO. For a bi-directional FIFO, the appropriate pointer depends on whether the FIFO is in input or output mode.

In any of the realizations of the invention, the processor overhead involved in servicing a transfer is nearly reduced by the ratio of the maximum transfer width divided by the minimum transfer width. This allows the processor more time to attend to other concurrent tasks, improving overall system performance. These and other features and advantages of the invention are apparent from the description below with reference to the following drawings.

DETAILED DESCRIPTION OF THE PREFERRED EMBODIMENTS

Figure 1:
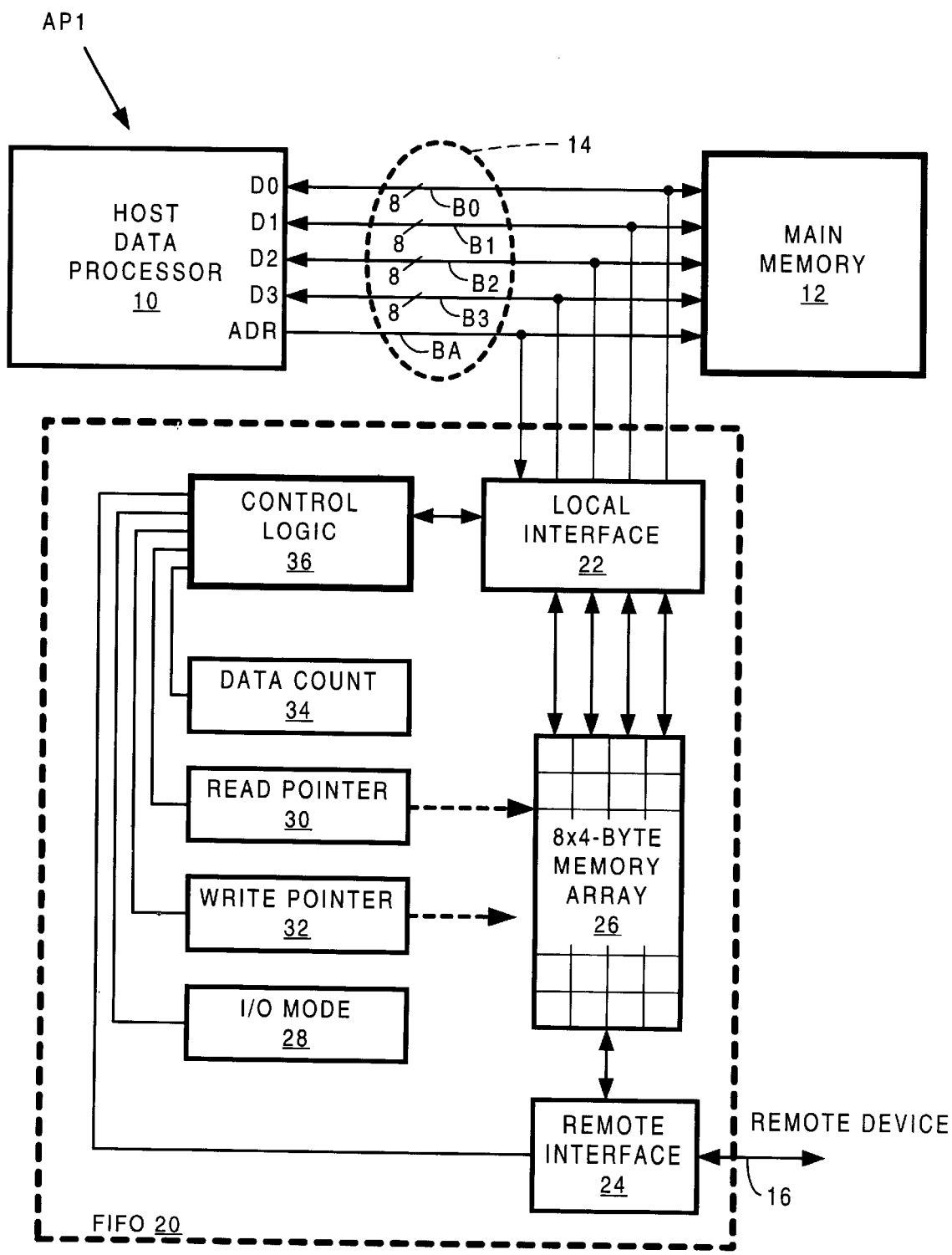
FIG. 1 is a schematic illustration of a data processing system including a host processor and a bi-directional FIFO during a read operation in accordance with the present invention.

A computer system AP1 comprises a host data processor 10, main memory 12, a local bus 14, a serial data path 16 to a remote device such as a modem, and a bi-directional (input-output) FIFO 20, as shown in FIG. 1. Data processor 10 is a 32-bit processor in that it can manipulate data in 32-bit groups. Conventionally, processor 10 reads, writes, and manipulates data in accordance with a program of instructions. The reads and writes are directed for the most part to memory main memory 12, which stores both data and program instructions.

Locations within main memory 12 are selected by addresses asserted by host processor on bus 14, which comprises data lines and address lines. Bus 14 is shown in FIG. 1 with four byte-wide data subbuses B0, B1, B2, and B3, and an address subbus BA that provides for 32-bit addressing, control lines (e.g., read/write), and interrupt paths. Processor 10 can generate many more addresses than are needed to specify main-memory locations. Most of the addresses are not used. However, some addresses are reserved for memory-mapped input-outupt (IO) operations in which a communications path is assigned an address, and communications are effected by performing reads and/or writes to that address.

In particular, five memory-mapped IO addresses are assigned to FIFO 20. Three are used to designate transfer widths. One address is devoted to singlet transfers, a second address is devoted to doublet (two-byte-wide) transfers, and a third address is devoted to quadlet (four-byte wide) transfers. A fourth address is used to determine the amount of data stored in FIFO 20. A fifth address is used by the processor to select between an input mode and an output mode for FIFO 20.

FIFO 20 comprises a local interface 22, a remote interface 24, an 8×4-byte memory array 26, a input-output direction mode flag 28, a read pointer 30, a write pointer 32, a data-count ("FIFO fullness") register 34, and control logic 36. Each pointer 30, 32, indicates at any given time a single one-byte FIFO storage location; i.e., the FIFO unit storage width is 1 byte (8 bits). The pointers are modulo 32 (Mod32) counters in that incrementing 31 yields 0.

Data-count register 34 is a register that stores the difference of the address indicated by write pointer 32 less the address indicated by read pointer 30, as calculated by control logic 36. Data-count register 34 is read from the fourth address in the IO memory space occupied by FIFO 20. Mode flag 28 is written to in response to a command communicated to the fifth address in the IO memory space occupied by FIFO 20.

Local interface 22 is coupled to host processor 10 via bus 14 for receiving addresses and transferring data. Internally, local interface 22 is coupled to memory array 26 for data reads and writes, and to control logic 36 to transfer address information thereto and receiving interrupts therefrom to forward to processor 10. Remote interface 24 is coupled to the remote device over serial data path 16 and to memory array 26 for data transfers. Control logic 36 is coupled to remote interface 24 to control its directional mode and availability to the remote device.

Control logic 36 is coupled to read pointer 30 for reading the address indicated therein and for providing increment commands thereto and reset commands thereto. Control logic 36 also indicates to read pointer 30 when its address is to be asserted to memory array 26. Control logic 36 is coupled to write pointer 32 for purposes analogous to its connection to read pointer 30.

Control logic 36 can access the pointer values and calculate the data "fullness" count for storage in data count register 34. When processor 10 asserts an address associated with the data fullness count, control logic 36 accesses this count and passes it to local interface 22 to be transmitted to processor 10. Finally, control logic 36 is coupled to I/O direction flag 28 for reading and writing the IO direction mode.

From the perspective of a remote device, operation of FIFO 20 is conventional. Two cases are considered, reception of data from a remote device while FIFO 20 is in input mode, and transmission to a remote device while FIFO 20 is in output mode.

With respect to receptions from a remote device, FIFO 20 operates in input mode as follows. A remote device can send serial data to FIFO 20 when FIFO 20 is not full and is in input mode. The serial data is received by remote interface 24 of FIFO 20. Remote interface 24 includes an 8-bit shift register that accepts serial data from serial data path 16. When full, the shift register outputs the data in parallel to the memory location with the address indicated by write pointer 32. Once this data is stored, write pointer 32 is incremented by one. Thus, succeeding bytes of data from the remote device are stored at memory locations with consecutively increasing (Mod32) storage locations.

As data is written into FIFO 20, assuming that it is not being read by processor 10, the (Mod32) difference between the write and read counts increases; control logic 36 repeatedly calculates this difference and stores the respective results in data-count register 34. Control logic 36 tracks the data count and transmits interrupts to processor 10 over interrupt lines of address subbus BA signaling when certain thresholds are met. In this vein, interrupts are sent to indicate when FIFO 20: 1) has no data (at 0 bytes); 2) has some data (at one byte); 3) has a useful amount of data (at 16 bytes), 4) is almost full (at 31 bytes), and 5) is full (at 32 bytes). Once FIFO 20 is full, it refuses to accept further input from the remote device.

FIFO 20 operates in output mode during transmission to a remote device as follows. The data stored at the FIFO memory location indicated by read pointer 30 is entered in parallel to the shift register of remote interface 34. Data is shifted out one bit at a time for serial transmission to the remote device. For each byte transmitted, read pointer 30 is incremented by one. Assuming no concurrent transfers from host processor 10, the data count decrements by one for each byte transferred. Control logic 36 transmits interrupts to host processor 10 to indicate when the full, almost full, useful, almost empty and empty thresholds are met. Once FIFO 20 is empty, it ceases to transmit further data to the remote device.

Figure 2:
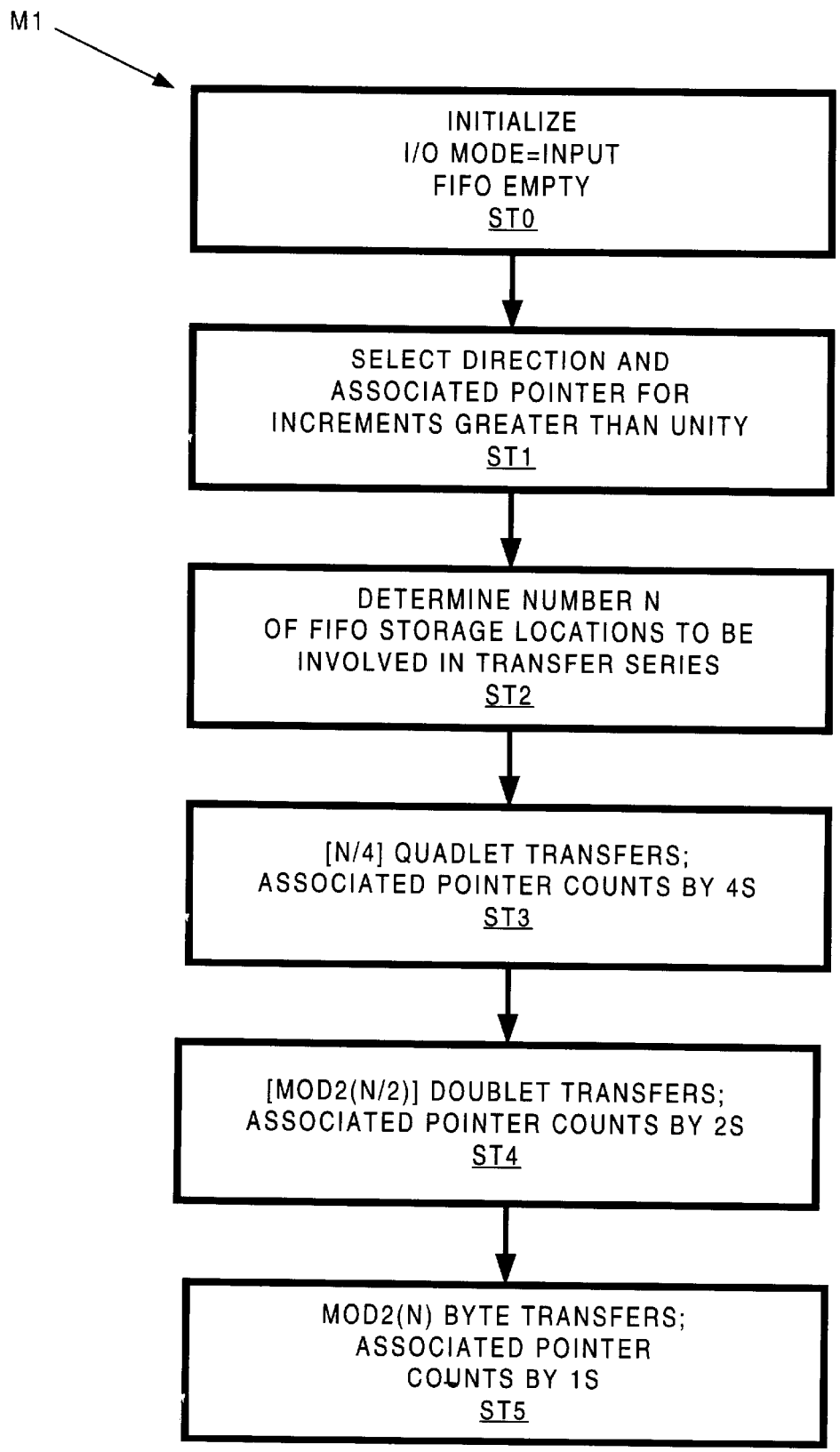
FIG. 2 is a flow chart of a method of the invention practiced in the context of FIG. 1.

The operation of computer system AP1 is detailed further below in the description of a processor-FIFO transfer method M1, flow charted in FIG. 2. Upon boot-up and initialization, the read and write pointers are set to zero and the I/O mode is set to input at step ST0. When the read and write pointers are equal, the data count in register 34 is zero, indicating FIFO 20 is empty. The empty status is signaled to host processor 10 via an interrupt line of the address subbus BA.

The input mode is selected by default so that FIFO 20 is available for receiving data from the remote device. However, in accordance with program instructions, processor 10 can select an I/O mode at step ST2. For example, processor 10 can select the output mode to begin transmission of data to a remote device; in this case, write pointer 32 is selected for possible incrementing by amounts greater than unity. Alternatively, after such a transmission, step ST2 can involve selection of the input mode for reception of data from a remote device; in this case, read pointer 30 is selected for possible incrementing by amounts greater than unity. The input mode is indicated by a 0 stored in input/output flag register 28, while the output mode is indicated by a 1.

Whichever I/O mode is selected, processor 10 determines the number N of storage locations to be involved in a series of transfers at step ST2. This is done by reading from an address that control logic 36 associates with data count register 34. If the data is to be written to FIFO 20, N is the number of storage locations to be filled by the data being transferred. If the data is to be read from FIFO 20, N is the number of storage locations read from. Due to the relatively high speed of the local transfers, N is typically constant throughout a single series of transfers. However, the invention does provide for updating N as a result of concurrent transfers involving a remote device.

Once processor 10 determines the data count, it can begin quadlet transfers at step ST3. All the data that can be transferred in quadlets is so transferred. The (integer) number of transfers is the characteristic of one-fourth N, i.e., [N/4]. This number can as low as 0 (no quadlet transfers) or as great as 8 (when FIFO 20 is full). With each quadlet transfer, control logic 26 increments (Mod 32) the associated pointer by four.

Once the quadlet transfers are completed, a doublet transfer can be implemented if appropriate at step ST4. The number of doublet transfers is the characteristic of N/2 expressed modulo 2, i.e., Mod2[N/2]. This number can be 0 (no doublet transfers) or 1 (exactly one doublet transfer). If a doublet transfer is implemented, the pointer corresponding to the selected I/O mode is incremented by 2. Otherwise, it is left unchanged.

Once the quadlet and doublet transfers are completed, a singlet transfer can be implemented if N is odd. The number of singlet transfers can be expressed as Mod2(N), which is 1 when N is odd and 0 when N is even. If a singlet transfer is made, the appropriate pointer is incremented by one. This completes the transfer series of method M1. If the transfer was a read, FIFO 20 should be empty (unless there were intervening receptions from the remote device). Method M1 can be reiterated by returning to step ST1.

In the illustrated method, the count N is treated as fixed for a series of transfers. Since at most nine processor-FIFO transfers are required and since such transfers are typically much faster than the serial transfers, the assumption that there are no changes due to activity on the remote end of the FIFO is fairly safe. Furthermore, if the assumption does not hold occasionally, the consequences are benign. However, the invention does provide for updating N during a series of transfers. For example, during a FIFO read operation, N can be checked once the quadlet transfers are completed to determine whether an additional quadlet should be transferred due to additional receptions from a remote device during the transfer. Such an option can be particularly useful for large FIFOs and fast remote-FIFO transfers.

Preferably, the wide transfers precede the narrow transfers so that more information is transferred sooner. Furthermore, if N is to be updated during a series of transfers, the narrower transfers should be scheduled for the end of the series so that time is not wasted if an additional reception results in an additional quadlet to be read.

In the illustrated embodiment, quadlet, doublet, and singlet transfers are provided for. Of course, if the data bus is wider, wider transfers can be utilized. In the illustrated embodiment, transfer-widths corresponding to all power-of-two multiples of the storage width up to the local bus width are provided for, and only these are provided for.

Alternatively, the present invention provides for omitting one or more powers of two. For example, quadlet and singlet transfers might be provided for, but not doublet transfers. This is simpler than the illustrated embodiment, but raises the maximum total number of transfers that might be required from nine to ten.

The invention also allows transfers widths that are non-power-of-two integer multiples of the storage width. For example, a 3-byte wide transfer mode could be added to the three widths used in the illustrated embodiment. In return for the additional complexity, the maximum number of transfers required falls from nine to eight.

While the illustrated FIFO is bi-directional, it is apparent that the invention applies as well to FIFOs designed only for input or only for output. Moreover, a bi-directional buffer can incorporate separate memories for input and output. Furthermore, any FIFO depths or widths are provided for. The main requirement is that the communications path between the processor and the FIFO be wider than the FIFO unit storage width. These and other variations upon and modifications to the described embodiments are provided for by the present invention, the scope of which is defined by the following claims.

What is claimed is:

1. A memory device comprising:

a memory array for storing data, said memory array having memory locations, said memory locations having respective addresses;

a read pointer for indicating the address of a first read data location to be read from;

a write pointer for indicating the address of a first write data location to be written to;

a remote interface through which said data is transferred between said memory array and a communications device;

a local interface through which said data is transferred between said memory array and a host processor, said local interface also having an address input for receiving address and control signals from said host processor, said local interface providing for plural width-modes of data transfer, including a minimum width mode in which exactly one memory location is involved in a data transfer at any given time, and a maximum width mode in which said memory data is transferred from at least two of said memory locations at a time; and a controller for selecting said width mode and adjusting one of said pointers as a function of the number of memory locations concurrently involved in a transfer through said local interface.

2. A memory device as recited in claim 1 wherein data transfers are reads of data from said memory array, said controller adjusting said read pointer by an amount that is a function of said width mode.

3. A memory device as recited in claim 1 wherein said data transfers are writes of data to said memory array, said controller adjusting said write pointer by an amount that is a function of said width mode.

4. A method of effecting a data transfer procedure between a host processor and memory device with a variable width host processor interface, said method comprising the steps of:

having the host processor determine the total number of memory storage locations to be involved in a series of transfers between said memory array and said host processor;

setting current number equal to total number;

if said current number exceeds the number of memory locations that can be involved in a maximum-width data transfer, effecting a maximum-width data transfer and adjusting a pointer the number of memory locations involved in a maximum-width data transfer, also reducing the current number by the number of memory locations involved in a maximum-width data transfer, and repeating this step; otherwise if said current number is less than the number of memory locations involved in a maximum-width data transfer but greater than zero, transferring data at less than maximum-width and reducing the current number and adjusting the pointer by the number of memory locations involved in the transfer; otherwise if said current number is equal to zero, ending the data transfer procedure.

5. A method as recited in claim 4 wherein said data transfer involves said host processor reading data from said memory array and wherein said pointer is a read pointer.

6. A method as recited in claim 4 wherein said data transfer involves said host processor writing data to said memory array and wherein said pointer is a write pointer.

* * * * *